(12) United States Patent
Hayakawa (10) Patent No.: US 10,474,078 B2
(45) Date of Patent: Nov. 12, 2019

(54) IMAGE FORMING APPARATUS AND METHOD OF CONTROLLING THE SAME

(71) Applicant: CANON KABUSHIKI KAISHA, Tokyo (JP)

(72) Inventor: Takuya Hayakawa, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/613,473

(22) Filed: Jun. 5, 2017

(65) Prior Publication Data

US 2017/0364008 A1    Dec. 21, 2017

(30) Foreign Application Priority Data

Jun. 16, 2016    (JP) .................................. 2016-119795

(51) Int. Cl.
| | | |
|---|---|---|
| *G03G 15/23* | (2006.01) | |
| *B65H 7/02* | (2006.01) | |
| *B65H 9/00* | (2006.01) | |
| *H04N 1/00* | (2006.01) | |
| *G03G 15/043* | (2006.01) | |
| *G03G 15/00* | (2006.01) | |
| *B65H 7/10* | (2006.01) | |

(52) U.S. Cl.
CPC ............ *G03G 15/231* (2013.01); *B65H 7/02* (2013.01); *B65H 7/10* (2013.01); *B65H 9/006* (2013.01); *G03G 15/043* (2013.01); *G03G 15/234* (2013.01); *G03G 15/6567* (2013.01); *H04N 1/00702* (2013.01); *H04N 1/00766* (2013.01); *B65H 2404/1424* (2013.01); *B65H 2511/20* (2013.01); *B65H 2511/22* (2013.01); *B65H 2701/1315* (2013.01)

(58) Field of Classification Search
CPC ............ G03G 15/6567; G03G 15/231; G03G 15/043; G03G 15/243; B65H 7/02; B65H 9/006
See application file for complete search history.

(56) References Cited

U.S. PATENT DOCUMENTS

| | | | |
|---|---|---|---|
| 8,408,830 B2 | 4/2013 | Ogata et al. | |
| 8,892,023 B2* | 11/2014 | Kawanago | G03G 15/6561 271/228 |
| 9,348,291 B2* | 5/2016 | Yamamoto | G03G 15/6567 |
| 2015/0132016 A1* | 5/2015 | Aoki | G03G 15/6567 399/16 |
| 2015/0378297 A1* | 12/2015 | Nakura | G03G 15/6558 399/395 |

* cited by examiner

*Primary Examiner* — Matthew G Marini
(74) *Attorney, Agent, or Firm* — Venable LLP (57) ABSTRACT

An image forming apparatus configured to form images on both sides of a sheet, includes an image forming unit, which is configured to form an image on an image bearing member, and a sheet conveying device, which is configured to move the sheet being conveyed toward a width direction, which is orthogonal to a conveyance direction. After the formed image is transferred onto a first surface of the sheet, the image forming apparatus inverts and conveys the sheet to transfer an image onto a second surface. Moreover, a side edge position of the sheet in the width direction is detected during conveyance for the transferring onto each of the first surface and the second surface, and an image writing start position for the image forming unit is determined based on a result of the detection to store a result of the determination in a memory.

11 Claims, 8 Drawing Sheets

| | SIZE | BASIS WEIGHT | SURFACE PROPERTY | SHAPE | OFFSET AMOUNT |
|---|---|---|---|---|---|
| PAPER HISTORY 1 | 210 × 297 | 90 | NORMAL | NORMAL | 0.7mm |
| PAPER HISTORY 2 | 297 × 210 | 100 | COATED | NORMAL | 0.3mm |
| PAPER HISTORY 3 | 297 × 420 | 120 | EMBOSSED | PUNCHED | 1.5mm |

IMAGE FORMING APPARATUS AND METHOD OF CONTROLLING THE SAME

BACKGROUND OF THE INVENTION

Field of the Invention

The present invention relates to an image forming apparatus, which is configured to form an image on a sheet.

Description of the Related Art

In the related art, there has been known an image forming apparatus, which is configured to form an image on a sheet, for example, paper, and which includes a mechanism to align the sheet and an image to be formed on the sheet. This mechanism moves (shifts) the sheet in a direction (width direction of the sheet), which is orthogonal to a conveyance direction of the sheet, for example, to thereby correct a sheet position. There has also been known an image forming apparatus including a sheet conveying device, which has a function of correcting a position and a posture (inclination) of the sheet to be conveyed to an image forming unit as described above.

For example, an image forming apparatus disclosed in U.S. Pat. No. 8,408,830 adjusts, based on a detection result of a sheet side edge position of a sheet in a width direction, an image forming position (image writing start position) of an image to be formed on a sheet after a predetermined number of pages. As a result, in the image forming apparatus, an offset amount in the width direction of a sheet storage and the like are canceled and a shift amount is decreased.

Moreover, this image forming apparatus includes a width direction correction mechanism, which is configured to correct a position of the sheet in a direction (width direction of the sheet) that is orthogonal to a conveyance direction.

This width direction correction mechanism includes width direction detecting means for detecting the position of the sheet in the width direction, in the vicinity of an upstream or downstream side of a registration roller, and shift means for shifting (shifting for registration) the registration roller in the width direction of the sheet while pinching the sheet.

Image forming apparatuses in recent years have features of increased image quality, increased quality, increased productivity, a reduced size, and the like. For example, as for the increased quality, a difference between relative positions of images on the sheet on the front and back of the sheet is an important factor in determining quality of a product. Moreover, with the increased productivity, a time interval for conveying a plurality of sheets is reduced. Therefore, time that can be spent on a shift operation performed by the registration roller for correcting the sheet position, a return operation after the shifting, and other such processing is also reduced. For example, as a positional deviation of the sheet traveling toward the image forming unit becomes larger, an operation amount of the shift operation for correcting the positional deviation also becomes larger. As a result, the return operation might not complete in a short time.

It is desired to minimize the shift amount for correcting the positional deviation. This is because a "twist" is generated in the sheet with an increased shift amount of the registration roller, for example. As a result, the sheet to be conveyed may be skewed, or shift accuracy may be reduced in some cases.

With the reduced size of the apparatus, there is a tendency that a distance between the registration roller including a shift mechanism and conveyance rollers provided on the upstream side (upstream side in the conveyance direction) of the registration roller is reduced. Then, during the shift operation performed by the registration roller, pinching of the sheet needs to be released for all conveyance rollers pinching the sheet except for the registration roller.

A general image forming apparatus includes a plurality of sheet feeding means, each of which is configured to store and feed the sheet, and a mechanism for automatically printing on both sides. Those components are different from each other in length of a conveyance path, and in whether the conveyance rollers are allowed to keep pinching, or need to release the pinching. Therefore, the shift amount of the registration roller in correcting the positional deviation is different for each of the sheet feeding means.

Moreover, in recent years, for the advantages of being excellent in adaptability to a variety of sheets and in print productivity, an intermediate transfer tandem type, in which image forming units of four colors are arranged in line above an intermediate transfer belt, has become mainstream. However, in color image formation, in particular, a circumferential length of the intermediate transfer belt is long, and hence a relatively long time is required from when an image of the first color is formed to when the image reaches a secondary transfer portion.

For example, in the image forming apparatus disclosed in U.S. Pat. No. 8,408,830, control is performed by predicting a subsequent paper position based on a position of a previous sheet, and hence the paper position cannot be predicted when there is no previous sheet. In other words, when there is no previous sheet, an image is formed with the position of the sheet in the width direction being unknown, and hence the productivity is maintained while sacrificing registration accuracy in the width direction of the sheet.

As described above, in the image forming apparatus disclosed in U.S. Pat. No. 8,408,830, in order to improve the registration accuracy for a predetermined page, there remains a problem in that image formation needs to wait until edge detection of the sheet by the width direction detecting means for detecting a position of the sheet in the width direction is complete. For example, when in duplex printing, an image on a first surface (front side) is formed first, and then an image on a second surface (back side) is formed, an image writing start position (image forming position) of the image to be formed on the second surface cannot be determined until the sheet reaches the width direction detecting means. Therefore, when the registration accuracy is given priority, there are problems in that a standby period until the start of image writing is further increased, and that a reduction in productivity becomes more significant.

It is a main object of the present invention to provide an image forming apparatus capable of increasing productivity without reducing registration accuracy.

SUMMARY OF THE INVENTION

An image forming apparatus according to the present disclosure is configured to form images on both sides of a sheet, and includes: an image forming unit configured to form an image on an image bearing member; a first conveyer configured to convey the sheet on a conveyance path, and to move the sheet being conveyed toward a width direction, which is orthogonal to a conveyance direction; a second conveyer configured to invert and convey, after the formed image is transferred onto a first surface of the sheet, the sheet to transfer an image onto a second surface of the sheet; a detector configured to detect a side edge position of the sheet in the width direction during conveyance for the transferring onto the first surface of the sheet, and during conveyance for the transferring onto the second surface of the sheet, respectively; and a controller configured to determine, based on a detection result from the detector, an image forming position for the image forming unit in the width direction of the sheet, which is orthogonal to the conveyance direction of the sheet, and to control a storage unit to store a result of the determination, wherein, in a case where an image forming position on the second surface of a previous sheet is stored in the storage unit, the controller determines an image forming position on the second surface of the sheet based on the stored image forming position, and controls the first conveyer to move the sheet based on the determined image forming position and the detection result from the detector.

Further features of the present invention will become apparent from the following description of exemplary embodiments (with reference to the attached drawings).

DESCRIPTION OF THE EMBODIMENTS

Now, an embodiment of the present invention is described with reference to the drawings taking, as an example, a case where the present invention is applied to an image forming apparatus. The image forming apparatus according to the embodiment receives a simplex job, which is an operation of forming an image on only one side of a sheet, for example, paper, and a duplex job, which is an operation of forming images on both of a front side and a back side, and executes printing operations corresponding to those print jobs. Moreover, in the duplex job, a case where an image is formed on the front side (first surface) of the sheet is referred to as "image formation on the first surface", and a case where an image is formed on the back side (second surface) is referred to as "image formation on the second surface", for example.

Exemplary Embodiment

Figure 1:
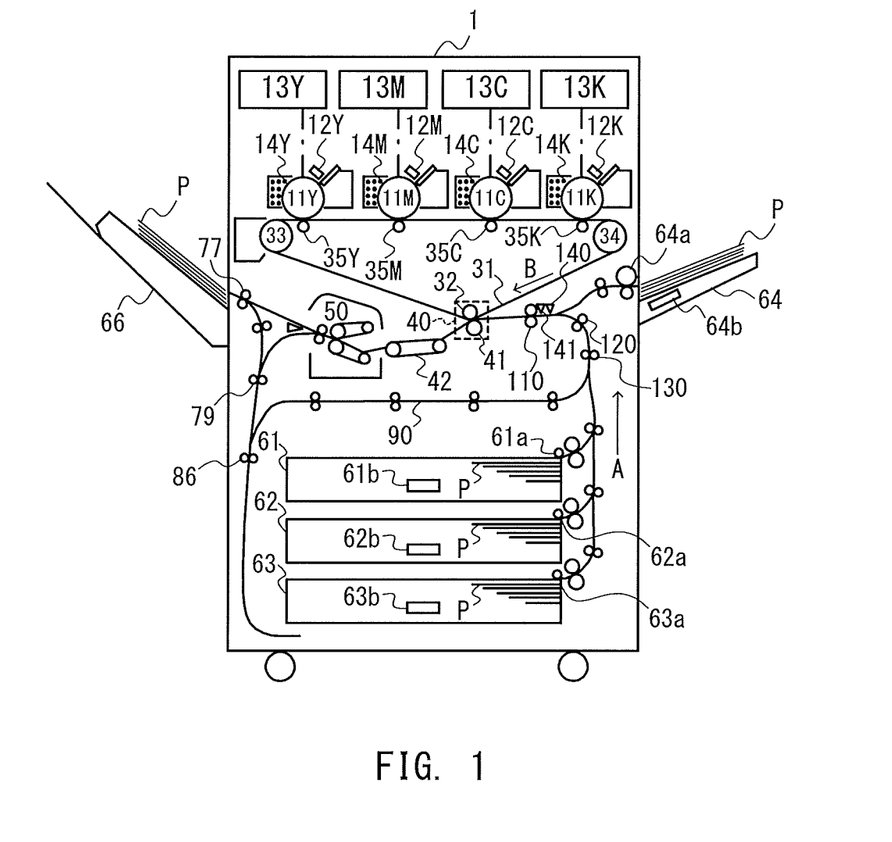
FIG. 1 is a schematic longitudinal cross-sectional view of an image forming apparatus according to an embodiment of the present invention.

FIG. 1 is a schematic longitudinal cross-sectional view of the image forming apparatus according to the embodiment.

An image forming apparatus 1 illustrated in FIG. 1 is a color image forming apparatus using an electrophotographic system, for example. In recent years, an intermediate transfer tandem type, in which image forming units of four colors are arranged in line above an intermediate transfer belt, and which is excellent in adaptability to a variety of sheets (e.g., paper), print productivity, and the like, has become mainstream. Under these circumstances, the image forming apparatus 1 according to the embodiment is described to include an image forming unit of the intermediate transfer tandem type.

The image forming apparatus 1 illustrated in FIG. 1 includes an image forming unit, which is configured to form an image (toner image), a secondary transfer portion 40, which is configured to transfer the toner image onto the sheet, and a sheet conveying device 100 (sheet conveying portion), which is configured to convey the sheet on a conveyance path.

The image forming unit of the image forming apparatus 1 includes photosensitive members (image bearing members) 11, charging devices 12, exposure devices 13, and developing devices 14 corresponding to colors of yellow (Y), magenta (M), cyan (C), and black (K). The image forming unit also includes an intermediate transfer belt 31, a secondary transfer inner roller 32, a drive roller 33, a tension roller 34, and primary transfer devices 35.

In the image forming unit, a surface of the photosensitive member 11, which is the image bearing member, is uniformly charged by the charging device 12 in advance, and the exposure device 13 is driven based on a signal of image information to form a latent image on the surface of the rotating photosensitive member 11. An electrostatic latent image formed on the image bearing member (on the surface of the photosensitive member 11) appears as a toner image through development with toner by the developing device 14. Thereafter, a predetermined pressure and electrostatic bias are applied by the primary transfer device 35 to transfer the toner image onto the intermediate transfer belt 31.

Next, the intermediate transfer belt 31 is described. The intermediate transfer belt 31 is suspended by the drive roller 33, the tension roller 34, the secondary transfer inner roller 32, and other such rollers, and is driven for conveyance toward a direction indicated by the arrow B illustrated in FIG. 1. Image forming processes of the colors of Y, M, C, and K, which are processed in parallel, are performed by superimposing the toner image, which is transferred onto the intermediate transfer belt 31, on a toner image of an upstream color. As a result, a full-color toner image is eventually formed on the intermediate transfer belt 31, and the toner image is conveyed to the secondary transfer portion 40.

Sheets P, which are transfer materials, are stacked and stored in a sheet storage. The sheet storage includes, for example, sheet feeding cassettes of sheet storages 61 to 63 for respective sizes and a manual feeding portion 64.

The sheet P is fed from a sheet feeding portion 61a, and passes through conveyance rollers 130, a pair of pre-registration rollers 120, and the like to be conveyed to a pair of registration rollers 110, for example.

The pair of pre-registration rollers 120 corrects a skew of the sheet P together with the pair of registration rollers 110. Specifically, the pair of pre-registration rollers 120 conveys the sheet P under a state in which a leading edge of the sheet P to be conveyed is brought into abutment against a nip portion of the pair of registration rollers 110 at a halt. The sheet P is warped in this manner to correct the skew.

The pair of registration rollers 110 convey the sheet P toward the secondary transfer portion 40 in accordance with a timing at which the toner image on the intermediate transfer belt 31 is transferred onto the sheet P.

The secondary transfer portion 40 includes a toner image transfer nip portion, which is formed by the secondary transfer inner roller 32 and a secondary transfer outer roller 41, which are opposed to each other, and applies a predetermined pressure and electrostatic bias to transfer the toner image onto the sheet P. The sheet P after the toner image is transferred is conveyed to a fixing device 50 by an air suction belt 42. The fixing device 50 applies a pressure and heating effects to melt and fix the toner image onto the sheet P.

Thereafter, the sheet P is directly conveyed to a sheet discharge tray 66 in a case where a sheet discharge mode is face-up sheet discharge. Meanwhile, in a case where the sheet discharge mode is face-down sheet discharge, reverse rollers 79 are reversed after being temporarily stopped under a state in which a trailing edge of the sheet P remains between the reverse rollers 79 by a predetermined distance, and then the sheet P is discharged by sheet discharge rollers 77.

Moreover, in a case where a printing mode is a duplex printing mode, duplex reverse rollers 86 are reversed after being temporarily stopped under a state in which the trailing edge of the sheet P remains between the duplex reverse rollers 86 by a predetermined distance, and the sheet P is conveyed again to the sheet conveying device 100 via a duplex conveyance portion 90. Then, an image is formed on the second surface in the image forming unit. Subsequent fixing and sheet discharge operations are similar to those for the first surface.

In the image forming apparatus 1 according to the embodiment, a description is given assuming, as an example, that there is adopted a sheet conveying method with the center being the reference, in which the sheet is conveyed while matching a center of a sheet conveyance path in a direction orthogonal to a sheet conveyance direction, and a center of the sheet in a width direction.

To the sheet storages 61, 62, and 63, size detection mechanisms 61b to 63b, which are configured to detect sizes of the sheets P stored in the sheet storages 61, 62, and 63, respectively, are provided.

Each of the size detection mechanisms 61b to 63b includes a side regulating plate (not shown), which is configured to regulate the position of the sheet P in the width direction, and a size detection lever (not shown). The size detection lever is in sliding contact with the side regulating plate, and is rotatable in conjunction with the side regulating plate. The side regulating plate is configured to be movable in line with a side edge portion of the sheet P. Moreover, when the side regulating plate is moved in line with the side edge portion of the sheet P, the size detection lever is rotated in conjunction with the movement.

Moreover, each of the size detection mechanisms 61b to 63b includes a plurality of sensors or switches, which are provided to detect, under a state in which the sheet feeding cassette is mounted to the sheet storage, a position of the size detection lever, which is moved in conjunction with the movable regulating plate. The regulating plate is configured to regulate the side edge portion of the sheet. When the sheet feeding cassette is mounted to the sheet storage, the size detection lever selectively turns on and off detector elements of the sensors or switches. As a result, the image forming apparatus 1 receives signals of different patterns, which are output by the sensors or switches depending on the sheet P stored in the sheet feeding cassette. The image forming apparatus 1 may recognize the size and the like of the sheet P stored in the sheet feeding cassette, based on the received signals.

Moreover, each of the size detection mechanisms 61b to 63b detects attachment or detachment of the sheet storages 61 to 63, for example, insertion or extraction of the sheet feeding cassette. For example, when the sheet feeding cassette of the sheet storage is extracted, all the detector elements of the sensors or switches are turned off by the size detection lever. To the manual feeding portion 64, a size detection mechanism 64b, which is configured to detect the size of the sheets P stored in the manual feeding portion 64, is provided.

The side regulating plate is provided to suppress the skew, and a positional deviation in the width direction of the sheet P, which occur when the sheet P is fed, and at conveyance rollers provided on the downstream side of a feeding roller. However, in reality, a slight gap may be generated between the side regulating plate and the sheet P. Due to this gap, the sheet P may be skewed, or the positional deviation in the width direction may occur when the sheet P is fed and conveyed toward the conveyance path.

As described above, in a case where the sheets P are set in the sheet storage, under the effects of a positional deviation of the side regulating plate or of oscillations generated by inserting or extracting the sheet feeding cassette, a center position of the sheet P may be deviated in a front-back direction. Further, there may also be a case where dimensions of the sheets P themselves are slightly different from a nominal size. In such case, the center position of the sheet continues to be offset by a certain value.

In a general image forming apparatus in the related art, control is performed so that the sheet is shifted based on a measured deviation amount of the side edge of the sheet. Therefore, as the deviation amount becomes larger, a movement amount (shift amount) of the registration rollers also becomes larger. Moreover, the sheet P supplied from the sheet storage may be skewed during the conveyance, and may further be obliquely fed under a state of being moved in the width direction. In order to avoid such state, in the embodiment, the sheet conveying device 100 included in the image forming apparatus 1 performs the skew correction and the like. This is described in detail below.

In the sheet conveying device 100, the leading edge of the sheet P that has been conveyed is brought into abutment against the nip portion of the pair of registration rollers 110 at a halt. Under this state, the sheet P is warped by conveying the sheet P by the pair of pre-registration rollers 120. In this manner, the sheet conveying device 100 corrects the skew by bringing the leading edge of the sheet P in line with the nip portion. A feed amount of the sheet P by the pair of pre-registration rollers 120 after the leading edge of the sheet P passes through a registration sensor 140 is set so that an appropriate amount of warpage is formed on the sheet P.

Moreover, between the pair of registration rollers 110 and the pair of pre-registration rollers 120 on the conveyance path, a contact image sensor (CIS) 141, which is configured to detect a side edge position of the sheet in the width direction (position of the edge portion of the sheet in the width direction), is provided. Based on a detection result of the CIS 141, a controller 200, which is to be described later, calculates a deviation amount between a nominal position (designed target position) and the detection result. Moreover, the side edge position is detected during conveyance for transferring onto the first surface of the sheet, and during conveyance for transferring onto the second surface.

The sheet conveying device 100 executes a shift operation of the pair of registration rollers 110 in the width direction based on the calculated deviation amount. In this manner, the sheet conveying device 100 corrects the sheet position so as to match the position of the sheet P in the width direction and a position of an image formed in the image forming unit.

Now, the controller, which is included in the image forming apparatus 1, and is configured to control functional components, is described.

Figure 2:
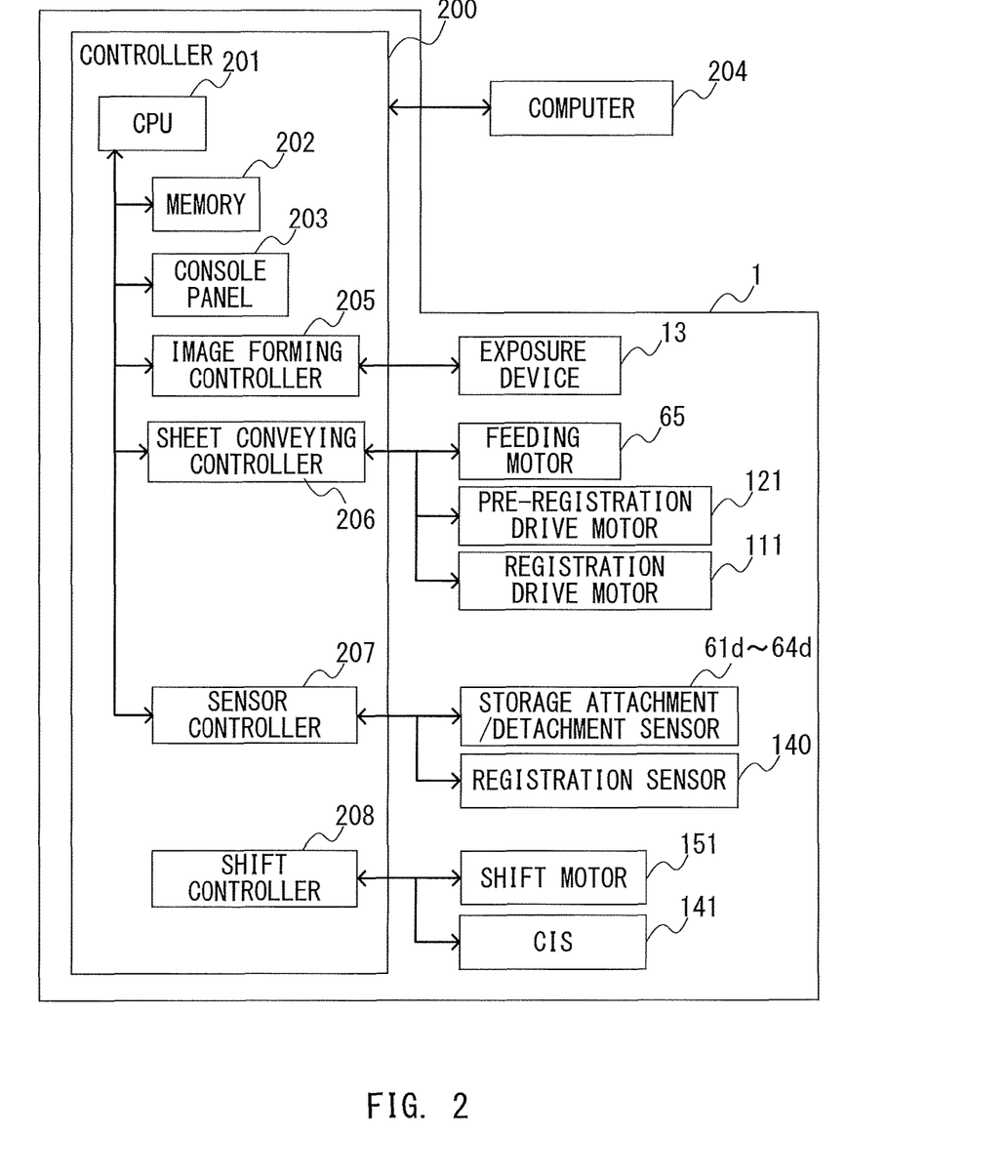
FIG. 2 is a block diagram for illustrating functional components of the image forming apparatus.

FIG. 2 is a block diagram for illustrating the functional components of the image forming apparatus 1.

The controller 200 includes a central processing unit (CPU) 201, a memory 202, a console panel 203, an image forming controller 205, a sheet conveying controller 206, a sensor controller 207, a shift controller 208, and other such functional units.

The CPU 201 executes a predetermined control program and the like, to thereby realize various kinds of processing performed by the image forming apparatus 1. The memory 202 functions as a storage unit. The memory 202 is a random access memory (RAM) or a read only memory (ROM), for example, and stores various programs and various kinds of data in a predetermined storage area.

The console panel 203 receives various kinds of information (e.g., size information, basis weight information, and information on a surface property) on the sheet used by a user for printing, and various operations performed by the user, such as an instruction to execute or stop printing. The image forming controller 205 issues an instruction to the image forming unit including the exposure device 13 to control image formation. The sheet conveying controller 206 issues instructions to a feeding motor 65, a pre-registration drive motor 121 and a registration drive motor 111, which are to be described later, and the like to control the conveyance of the sheet P. The sensor controller 207 performs control to start or stop detections by the size detection mechanisms 61b to 64b and the registration sensor 140, and receives detection results from those sensors.

The shift controller 208 receives the detection result from the CIS 141, and issues, in accordance with the detection result, an instruction to start or stop driving a shift motor 151, which is to be described later, and other such instructions. In this manner, the shift operation of the pair of registration rollers 110 toward the width direction (direction orthogonal to a conveyance direction) in the sheet conveying device 100 is controlled.

Further, for example, there may also be adopted a configuration in which various kinds of information on the sheet, which is to be used for printing, may be received via a computer (e.g., computer 204 illustrated in FIG. 2) connected to the controller 200 via a network.

Now, the specific structure of the sheet conveying device 100 is described.

Figure 3:
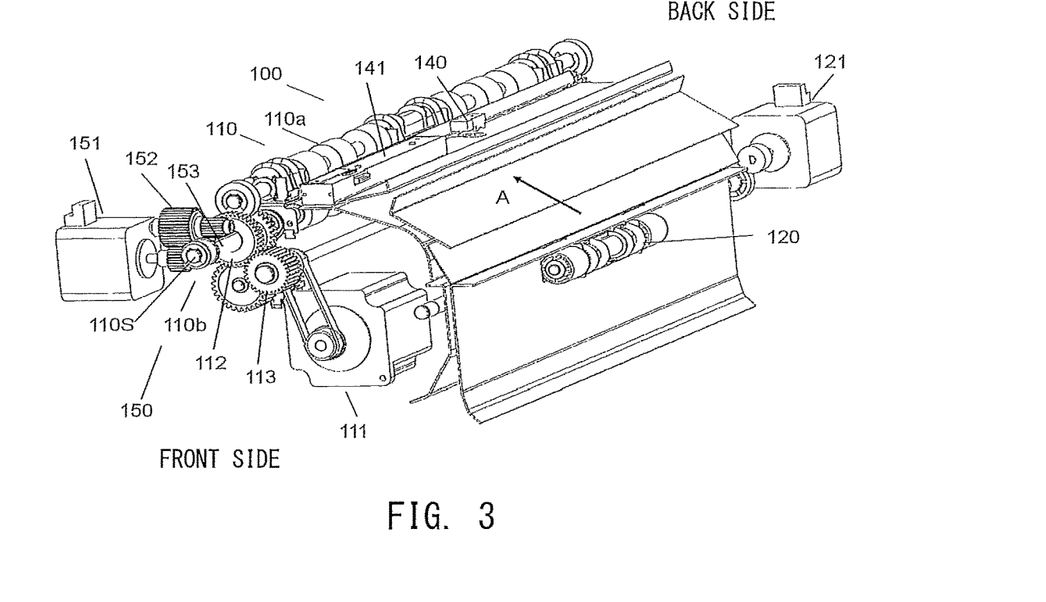
FIG. 3 is a perspective view for illustrating an example of main components of a sheet conveying device.

FIG. 3 is a perspective view for illustrating an example of main components of the sheet conveying device 100. The sheet conveying device 100 is provided on the midway of the conveyance path connecting sheet feeding portions 61a to 64a and the image forming unit.

The sheet conveying device 100 illustrated in FIG. 3 includes the pair of registration rollers 110 (upper roller 110a, lower roller 110b, and rotation shaft 110S), the registration drive motor 111, and an input gear 112.

The sheet conveying device 100 also includes an idler gear 113 and the pair of pre-registration rollers 120. The sheet conveying device 100 further includes the pre-registration drive motor 121, the registration sensor 140, the CIS 141, the shift motor 151, a pinion gear 152, and a rack 153.

The pre-registration drive motor 121 drives to rotate the pair of pre-registration rollers 120 provided on the sheet conveyance path. The registration drive motor 111 drives to rotate the pair of registration rollers 110 via the input gear 112 and the idler gear 113.

The pair of registration rollers 110 includes the upper roller 110a, and the lower roller 110b, which is fixed to the rotation shaft 110S. The rotation shaft 110S is fixed to a main body of the apparatus to be movable in the width direction of the sheet.

Along with the movement of the rotation shaft 110S in the width direction of the sheet P, the upper roller 110a is moved integrally with the lower roller 110b.

The rack 153 is configured to be freely rotatable in a direction of rotation with respect to the rotation shaft 110S. Moreover, the rack 153 is supported to be fixed in the width direction of the sheet. In other words, the pinion gear 152, to which a driving force of the shift motor 151 is transmitted, is rotated to move the rack 153 in the width direction of the sheet P. Therefore, the sheet P, which is pinched between the pair of registration rollers 110, may be moved in the width direction.

In this manner, the shift operation of the pair of registration rollers 110 is achieved via the pinion gear 152 and the rack 153.

A tooth width of the idler gear 113 is wider than that of the input gear 112. Therefore, even when the pair of registration rollers 110 and the input gear 112 are moved in the width direction, meshing of the gears is maintained. In this manner, the pair of registration rollers 110 may be rotated.

On the upstream side of the pair of registration rollers 110, there is provided the CIS 141, which is configured to detect the side edge position of the sheet in the width direction during the conveyance for the transferring onto the first surface of the sheet, and during the conveyance for the transferring onto the second surface of the sheet. The CIS 141 is provided at a decentered position in the width direction of the sheet P with respect to a conveyance direction indicated by the arrow A in FIG. 3. This is because, in the correction of the position of the sheet P, the side edge position on only one side of the sheet P may be detected.

The CIS 141 is also configured to be capable of detecting a side edge position of each of a sheet P having the smallest width and a sheet P having the largest width of sheet sizes permitted to use in the image forming apparatus 1.

In order not to reduce detection accuracy of the CIS 141, for example, the CIS 141 is provided at a position as close to the pair of registration rollers 110 as possible.

Further, it is desired that a conveyance guide gap (not shown) of the CIS 141 be set uniform to provide such space as to accommodate the warpage generated on the sheet between the CIS 141 and the pair of pre-registration rollers 120. This is because, as described above, the warpage is formed on the sheet P between the pair of pre-registration rollers 120 and the pair of registration rollers 110 to correct the skew.

Next, the shift operation by the pair of registration rollers 110 is described with reference to FIG. 4.

Figure 4:
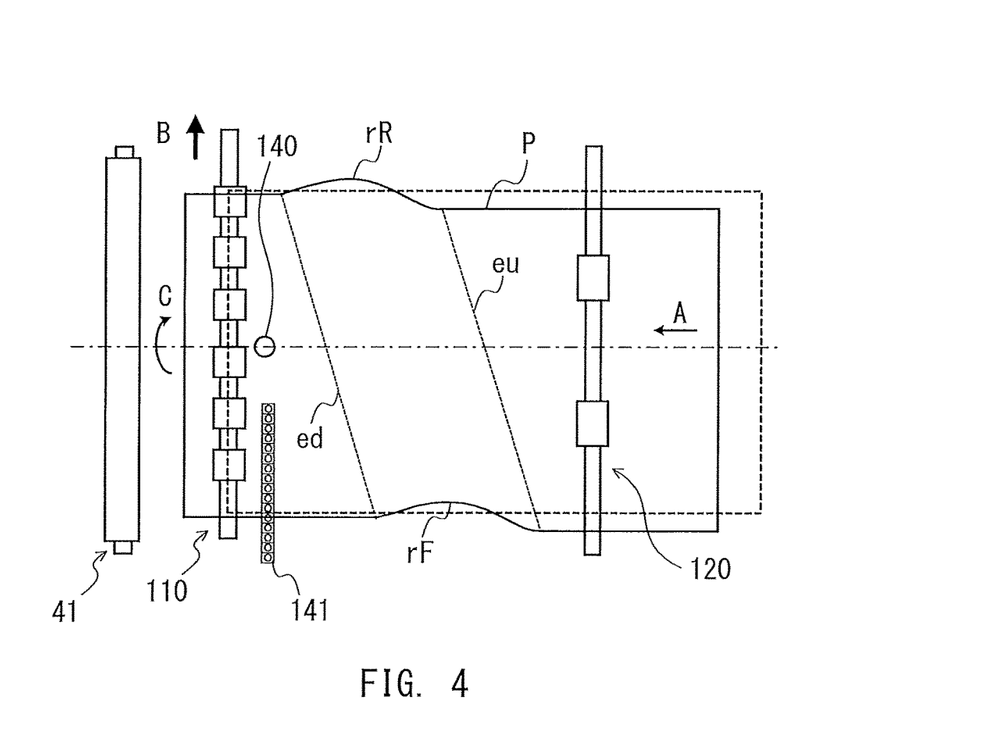
FIG. 4 is a view for illustrating a shift operation performed by a pair of registration rollers 110.

FIG. 4 is a view for illustrating the shift operation by the pair of registration rollers 110. In FIG. 4, there is schematically illustrated an appearance of the sheet P at a time when a sheet side edge position is detected by the CIS 141 during the conveyance in the direction of the arrow A, and when the pair of registration rollers 110 is shifted in the direction of the arrow B.

In the warpage formed on the sheet between the pair of pre-registration rollers 120 and the pair of registration rollers 110, a "twist" is formed by the shifting. Specifically, a warpage rF is formed on the front side of the sheet in the width direction, and a warpage rR is formed on the back side of the sheet. Moreover, the warpage rR on the back side relatively transitions to the downstream side in the conveyance direction, and hence a point of inflection of the warpage has an oblique shape as indicated by the broken lines ed and eu.

With the "twist" generated in the warpage, a twist reaction force is generated at a point pinched by the pair of registration rollers 110, and hence a force to turn in the direction of the arrow C is generated. Therefore, when the turning force exceeds a pinching force of the pair of registration rollers 110, the sheet P turns to generate the skew. In view of such facts, in such structure as that of the image forming apparatus 1 according to the embodiment, it is desired that an image writing start position (image forming position) on the photosensitive member 11 be aligned with the sheet P while a shift amount for the shift operation on the sheet P be set to a predetermined amount or less.

Figure 5:
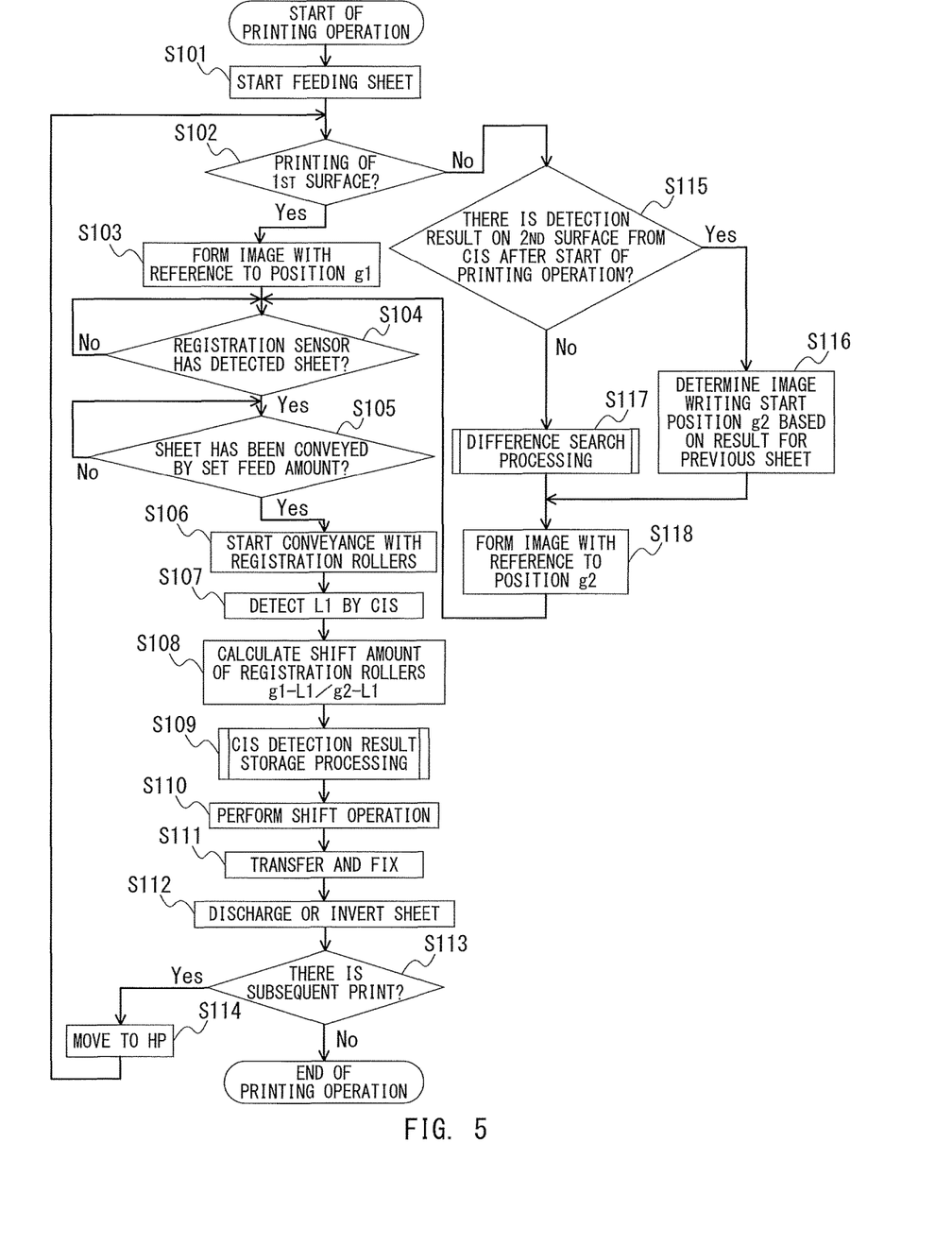
FIG. 5 is a flowchart for illustrating an example of image writing start position determination processing, which is performed by the image forming apparatus.

FIG. 5 is a flow chart for illustrating an example of processing of determining the image writing start position of the image to be formed on the sheet P, which is performed by the image forming apparatus 1. Moreover, FIG. 6A to FIG. 7B are views for illustrating a skew correction operation for the sheet P and a position correction operation in the width direction in the sheet conveying device 100. With reference to those figures, the processing of determining the writing start position of the image to be formed on the sheet P is described. The processing steps illustrated in FIG. 5 are mainly executed by the CPU 201 of the controller 200.

The CPU 201 starts the printing operation upon receiving a print instruction (print job) from the user via the console panel 203 or the computer 204. The user may issue instructions on the number of prints and the like, and specify a type of the sheets used for printing. Moreover, the CPU 201 acquires sheet information on the stored sheets P via the size detection mechanisms 61b to 64b.

The CPU 201 starts feeding the sheet P toward the conveyance path (Step S101). The CPU 201 determines whether or not it is printing on the first surface in the print job (Step S102). When it is determined that it is the printing on the first surface (Step S102: Yes), the CPU 201 forms an image with reference to an image writing start position (g1, see FIG. 7B) on the first surface, which has been previously determined (Step S103).

The image writing start position (g1) on the first surface is controlled so that, for example, in a case where there is a detection result from the CIS 141 for a previous sheet, the image is formed with reference to an image writing start position that is determined based on the detection result. For example, a writing start position of an image to be formed on the first surface of the second sheet is determined based on a side edge position of the first surface of the first sheet.

Figure 6A:
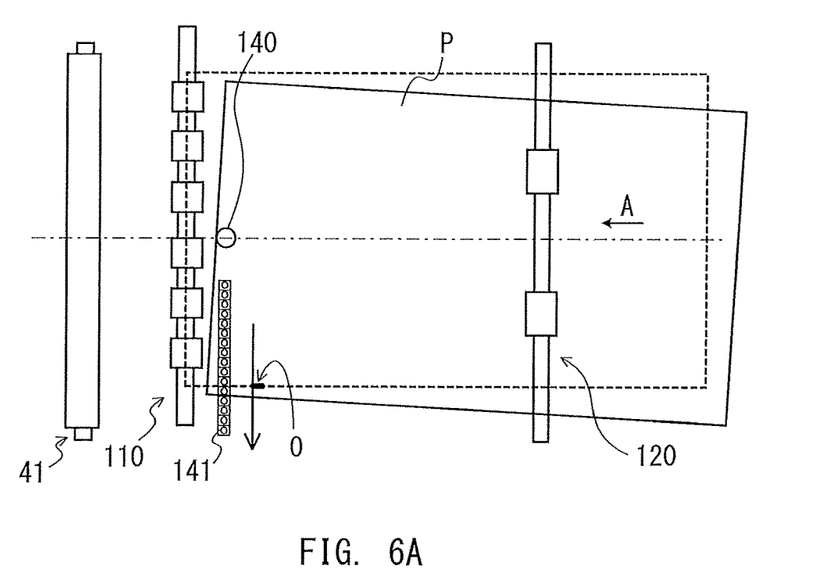
FIG. 6A and FIG. 6B are views for illustrating a skew correction operation for the sheet and a position correction operation in a width direction in the sheet conveying device.
Figure 6B:
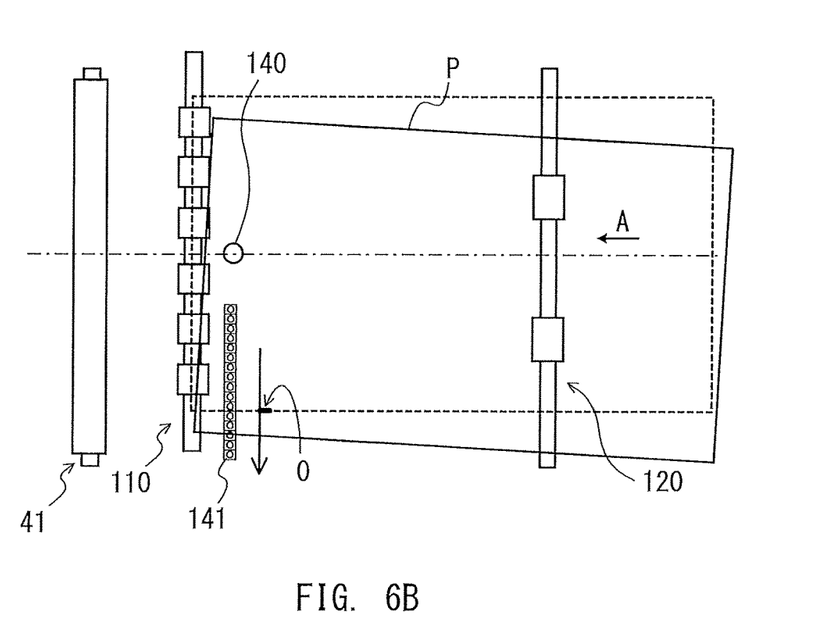

Meanwhile, the sheet P is conveyed to the pair of pre-registration rollers 120. Here, the conveyed sheet P enters a state of being skewed by being rotated to the right with respect to the conveyance direction A as illustrated in FIG. 6A, and of being deviated to the left side with respect to the width direction of the sheet, which is orthogonal to the conveyance direction A. The dotted rectangle illustrated in FIG. 6A schematically indicates a state in which the leading edge of the sheet P that has been conveyed without being skewed or deviated in the width direction of the sheet abuts against the nip portion of the pair of registration rollers 110.

The side edge position of the sheet in the width direction at this time is defined as a zero point, and the left side is defined as a positive direction.

Returning to FIG. 5, the CPU 201 determines whether or not the registration sensor 140 (see FIG. 3) has detected the sheet P (Step S104). After the registration sensor 140 detects the sheet P, the leading edge of the sheet P is supposed to abut against the nip portion of the pair of registration rollers 110 at a halt. Therefore, after the registration sensor 140 detects the sheet P, the pair of pre-registration rollers 120 feed the sheet P by a set feed amount to form a predetermined amount of warpage on the sheet P. In this manner, the skew correction is performed on the sheet P.

When the registration sensor has detected the sheet (Step S104: Yes), the CPU 201 determines whether or not the sheet P has been conveyed by the set feed amount (Step S105, FIG. 6B).

When the sheet P has been conveyed by the set feed amount (Step S105: Yes), the CPU 201 starts conveying the sheet P with the pair of registration rollers 110 (Step S106).

Figure 7A:
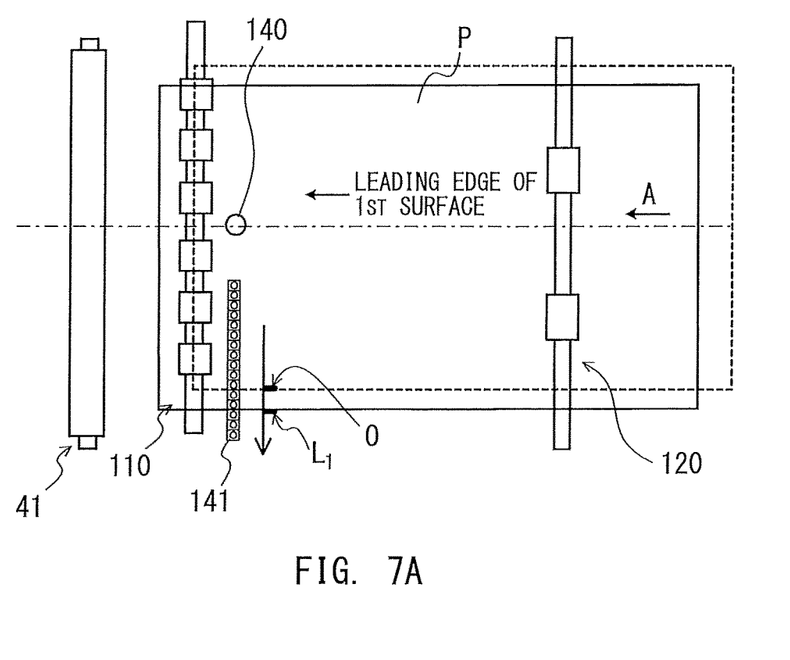
FIG. 7A and FIG. 7B are views for illustrating a skew correction operation for a sheet P and a position correction operation in the width direction, which are different from FIG. 6A and FIG. 6B.
Figure 7B:
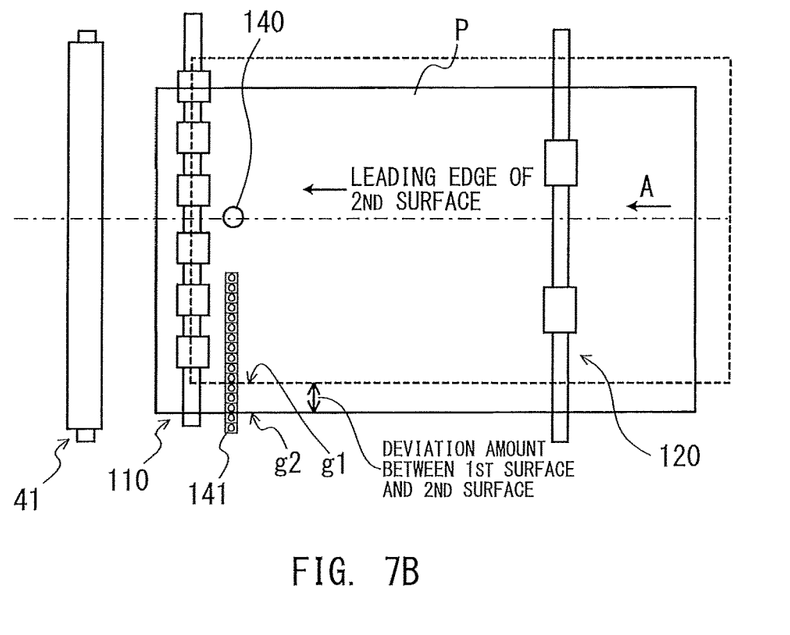

The CPU 201 detects, for the sheet P after the skew correction, the side edge position of the sheet P on the leading edge side in the conveyance direction via the CIS 141 (Step S107, FIG. 7A).

The CPU 201 determines a sheet position correction amount (correction amount of the sheet in the width direction) based on the detection result (L1, see FIG. 7A) (Step S108). The sheet position correction amount in this case may be calculated by subtracting, from the image writing start position (g1) of the image to be formed on the first surface, the detection result (L1) from the CIS 141 (g1-L1) (see FIG. 7B).

The CPU 201 performs processing of storing the detection result (L1) from the CIS 141 in the memory 202 (CIS detection result storage processing) (Step S109). Details of this processing are described later.

The CPU 201 performs the shift operation on the sheet P in accordance with the sheet position correction amount, which is determined in the processing of Step S108 (Step S110). After an image (toner image) is transferred onto the sheet P in the secondary transfer portion 40, the CPU 201 fixes the toner image via the fixing device 50 (Step S111).

In a case of the simplex job, the CPU 201 discharges the sheet P, onto which the toner image has been fixed, to the sheet discharge tray 66. Meanwhile, in a case of the duplex job, the CPU 201 performs inverting processing to flip the front and the back of the sheet P for image formation on the second surface (Step S112).

The CPU 201 determines whether or not there is a subsequent print (Step S113). When it is determined that there is no subsequent print (Step S113: No), the printing operation is ended. Otherwise (Step S113: Yes), the pair of registration rollers 110 are moved to a home position (HP: center position) (Step S114). Thereafter, the CPU 201 returns to the processing of Step S102.

When it is determined that the print job is printing on the second surface in the duplex job (Step S102: No), the CPU 201 inverts the sheet P by switching back in the duplex reverse rollers 86, and conveys the sheet P again to the pair of pre-registration rollers 120 through conveyance by the duplex conveyance portion 90.

At this time, during a period from when the image is transferred and fixed onto the first surface of the sheet P to when the sheet P is switched back in the duplex reverse rollers 86 to be conveyed to the pair of registration rollers 110 through the duplex conveyance portion 90, a deviation occurs in the position of the sheet in the width direction.

Factors that cause this deviation include, for example, misalignment of the fixing device 50 and the duplex conveyance portion 90, and a posture (skew amount) of the sheet that is conveyed after the image is transferred and fixed onto the first surface.

The CPU 201 determines whether or not there is a detection result of a side edge position of the second surface for a previous sheet as the detection result from the CIS 141 after the start of the printing operation (Step S115). When there is a detection result of the second surface (Step S115: Yes), the CPU 201 determines an image writing start position (g2) of the image to be formed on the second surface of the sheet P based on the detection result (Step S116). Otherwise (Step S115: No), the CPU 201 determines the image writing start position of the image to be formed on the second surface of the sheet P through difference search processing (Step S117). Details of the difference search processing are described later.

The CPU 201 forms an image with reference to the determined image writing start position (g2) (Step S118). Subsequent processing steps are similar to those for the first surface, and hence a description thereof is omitted.

Next, the CIS detection result storage processing (Step S109), in which the detection result from the CIS 141 is stored in the memory 202, is described with reference to the flowchart of FIG. 8.

Figure 8:
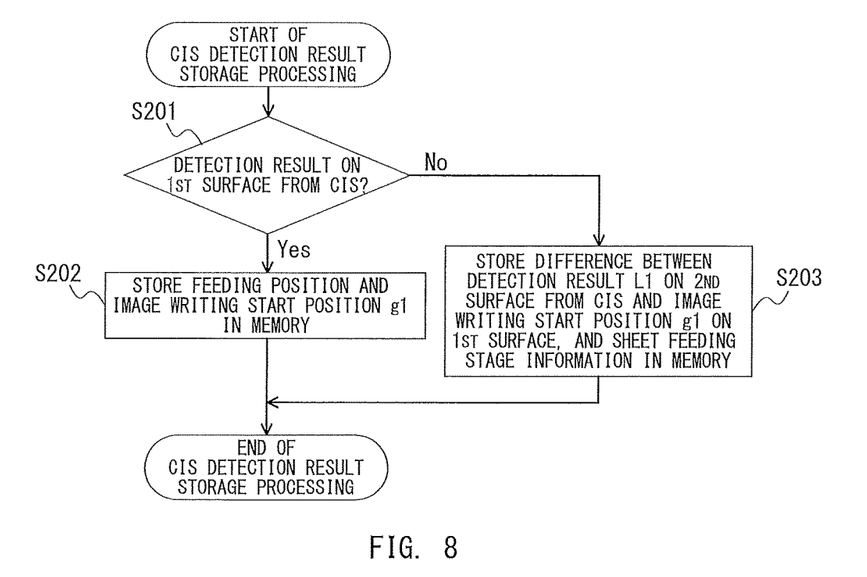
FIG. 8 is a flow chart for illustrating an example of a processing procedure of CIS detection result storage processing.

FIG. 8 is a flow chart for illustrating an example of a processing procedure of the CIS detection result storage processing.

The CPU 201 determines whether or not the detection result from the CIS 141 is a detection result for the first surface (Step S201).

When it is determined that the detection result is a detection result for the first surface (Step S201: Yes), the CPU 201 stores, in the memory 202, a feeding position, for example, the sheet feeding cassette from which the sheet as a target of detection has been fed, the image writing start position (g1) of the image to be formed on the first surface, and other such information (Step S202). The stored image writing start position (g1) is used in determining the image writing start position of the image to be formed on the first surface of the sheet P. Moreover, not the detection result (L1) from the CIS 141 but the image writing start position (g1) is stored as the information. This is for the purpose of controlling the shift operation on the sheet P with reference to the image writing start position (g1).

When it is determined that the detection result is a detection result for the second surface (Step S201: No), the CPU 201 stores, in the memory 202, a difference between the detection result (L1) for the second surface from the CIS 141 and the image writing start position (g1) of the image to be formed on the first surface (Step S203). Further, the CPU 201 stores, in the memory 202, sheet feeding stage information in association with those pieces of information. The sheet feeding stage information contains information on a sheet type, for example, the size of the sheet (paper), a paper basis weight, a paper surface property, and a paper shape, and offset information that has been applied last time. One or a combination of a plurality of those pieces of information is used to determine the sheet type. The sheet feeding stage information is provided for each of the sheet feeding stages (61 to 64).

Figure 9:
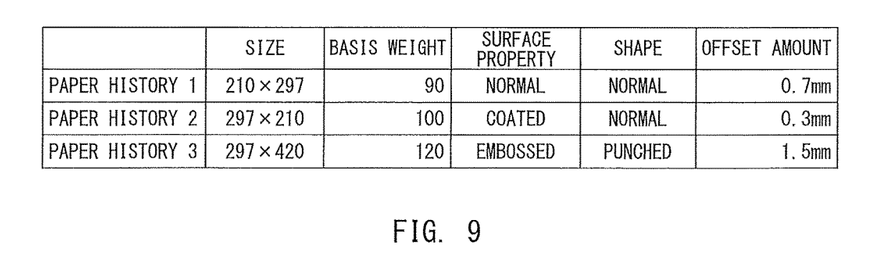
FIG. 9 is a table for showing an example of sheet feeding stage information.

FIG. 9 is a table for showing an example of the sheet feeding stage information. In the sheet feeding stage information, information on sheet types of sheets that have been fed in the past is stored as paper histories. In the example shown in FIG. 9, to each of Paper histories 1 to 3, the paper size, the paper basis weight, the paper surface property, the paper shape, an offset amount, and other such information are associated.

For example, "Paper history 1" in FIG. 9 contains the following settings: a paper size of 210 mm×297 mm, a paper basis weight of 90 g, and a paper surface property and a paper shape of "normal". Moreover, in association with those settings, a deviation of 0.7 mm, which has occurred between the image writing start position (g1) of the image to be formed on the first surface and the detection result of the second surface of the sheet P from the CIS 141, is stored as an offset amount. This data of the offset amount is an offset amount that has been applied when a sheet of the sheet type of interest has been fed last time. Next, the difference search processing is described with reference to the flow chart of FIG. 10.

Figure 10:
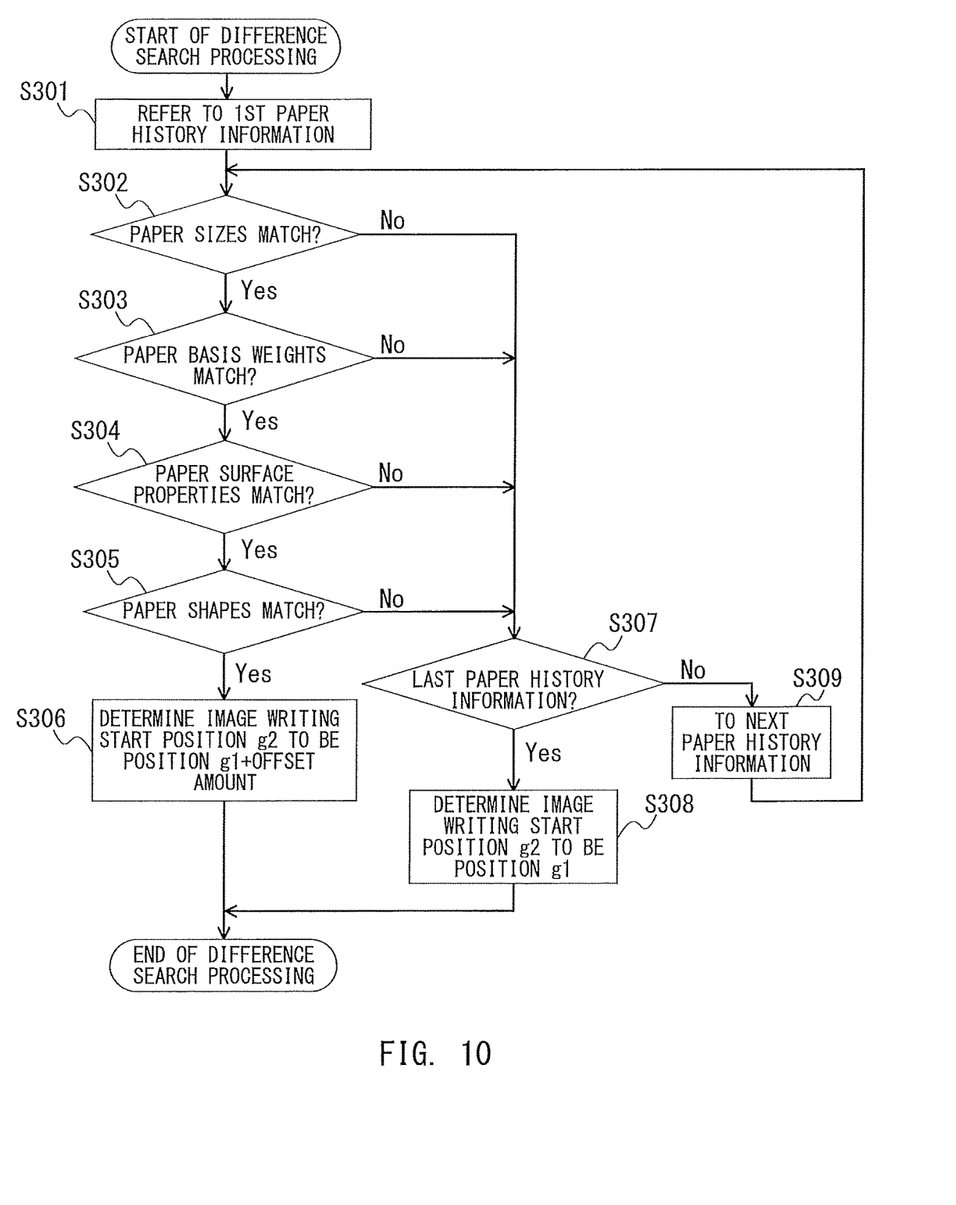
FIG. 10 is a flow chart for illustrating an example of a processing procedure of difference search processing.

FIG. 10 is a flow chart for illustrating an example of a processing procedure of the difference search processing.

The CPU 201 determines whether or not information on the type of sheets in the sheet feeding stage that are the current target to be fed matches anyone of the paper histories contained in the sheet feeding stage information. Specifically, the CPU 201 refers to the first paper history information (e.g., Paper history 1 shown in FIG. 9) contained in the sheet feeding stage information to compare the types of the sheets (Step S301).

The CPU 201 determines whether or not the paper size of the sheet to be fed matches the paper size in the paper history information (Step S302). When it is determined that the paper sizes match (Step S302: Yes), the CPU 201 determines whether or not the paper basis weight matches the paper basis weight in the paper history information (Step S303). When it is determined that the paper basis weights match (Step S303: Yes), the CPU 201 determines whether or not the paper surface property matches the paper surface property in the paper history information (Step S304). When it is determined that the paper surface properties match (Step S304: Yes), the CPU 201 determines whether or not the paper shape matches the paper shape in the paper history information (Step S305). When it is determined that the paper shapes match (Step S305: Yes), the CPU 201 proceeds to processing of Step S306. Meanwhile, in a case where it is determined that any one of those pieces of information does not match in the processing of each of Steps S302 to S305, the CPU 201 proceeds to processing of Step S307.

The CPU 201 determines, as an image writing start position (g2) of the image to be formed on the second surface, a value obtained by adding the offset amount in the paper history information to the image writing start position (g1) of the image to be formed on the first surface (Step S306).

With this processing, in a case where the type of the sheet to be conveyed is the same type as a sheet at the time when the offset amount is determined, that is, a sheet that has been fed last, the image writing start position of the image to be formed on the second surface may be determined accurately based on deviation amounts between the sheet positions of the images to be formed on the first surface and the second surface. This determination is made before the sheet P reaches the CIS 141.

Moreover, the CPU 201 determines whether or not the paper history information (first paper history information) that has been referenced in the processing of Step S301 is the last paper history information (e.g., Paper history 3 shown in FIG. 9) contained in the sheet feeding stage information (Step S307).

When it is determined that the referenced paper history information is the last (Step S307: Yes), the CPU 201 determines the image writing start position (g2) of the image to be formed on the second surface to be the same position as the image writing start position (g1) of the image to be formed on the first surface (Step S308). Otherwise (Step S307: No), the CPU 201 changes the reference paper history information to the next paper history information (Step S309), and returns to the processing of Step S302.

As described above, in the image forming apparatus 1 according to the embodiment, the image writing start position of the image to be formed on the second surface is determined based on the past sheet passage history, with the result that image formation on the second surface can be started before the paper that is to have an image printed on the second surface reaches the CIS 141. Therefore, the shift amount of the sheet in the printing operation on the second surface can be minimized while the productivity is increased.

In the embodiment, when a deviation between paper positions in printing on the first surface and the second surface of the sheet P is calculated, the image writing start position (g1) of the image to be formed on the first surface is used as the paper position of the image to be formed on the first surface. The present invention is not limited thereto, and in order to further improve registration accuracy, there may be adopted a configuration in which the detection processing by the CIS 141 is performed again after the shift operation on the first surface of the sheet P.

Moreover, in the embodiment, there has been described the example in which the CIS 141 is provided immediately before the pair of registration rollers 110 on the upstream side. However, the present invention is not limited thereto, and there may be adopted a configuration in which the CIS 141 is provided on the downstream side. Moreover, in the embodiment, as a skew correction method, there has been described the example in which the leading edge of the sheet is brought into abutment against the pair of registration rollers at a halt to form the warpage for the correction by the pair of pre-registration rollers, but the present invention is not limited thereto. For example, there may be adopted a configuration in which, as an abutting member, a movable planar shutter is provided immediately before the pair of registration rollers. In this case, the pair of registration rollers may be rotated during the skew correction.

As described above, according to the present invention, the shift amount of the sheet in the printing operation on the second surface can be minimized while the productivity is increased. Moreover, the control in the embodiment may be realized by a micro-processing unit (MPU), an application specific integrated circuit (ASIC), or a system on a chip (SoC), for example.

The above-described embodiment is given just for the purpose of describing the present invention more specifically, and the scope of the present invention is not limited by the example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-119795, filed Jun. 16, 2016 which is hereby incorporated by reference herein in its entirety.

What is claimed is:

1. An image forming apparatus configured to form images on both sides of a sheet, the image forming apparatus comprising:
    an image forming unit configured to form an image on an image bearing member;
    a first conveyer configured to convey the sheet on a conveyance path, and to move the sheet being conveyed toward a width direction, which is orthogonal to a conveyance direction;
    a second conveyer configured to invert and convey, after the formed image is transferred onto a first surface of the sheet, the sheet to transfer an image onto a second surface of the sheet;
    a detector configured to detect a side edge position of the sheet in the width direction during conveyance for the transferring onto the first surface of the sheet, and during conveyance for the transferring onto the second surface of the sheet, respectively; and
    a controller configured to: (1) determine, based on a first detection result of the detector for the first surface of a previous sheet which precedes a first sheet, a first forming position of an image to be transferred on the first surface of the first sheet on the image bearing member in the width direction, and (2) control, based on the first forming position and a second detection result of the detector for the first surface of the first sheet, the first conveyer to move the first sheet,
    wherein the controller determines a second forming position of the image to be transferred on the second surface of the first sheet based on a third detection result of the detector for the second surface of the previous sheet, and controls the first conveyer to move the first sheet based on the second forming position and a fourth detection result of the detector for the second surface of the first sheet.

2. The image forming apparatus according to claim 1, further comprising a storage unit configured to store first information related to a difference between (1) a detected result of the detector for the second surface of the sheet and (2) an image forming position in the width direction of the image to be transferred on the first surface of the sheet.

3. The image forming apparatus according to claim 2, wherein the first information is stored in association with a type of the sheet, and
    wherein, in a case where a type of the first sheet in the image forming on the second surface of the first sheet of a print job is the same as a type related to the first information, the controller determines, based on the first information stored in the storage unit, an image forming position in the width direction of the image to be transferred on the second surface of the first sheet.

4. The image forming apparatus according to claim 3, wherein, in a case where the type of the first sheet is not the same as the type related to the first information, the controller determines, as the image forming position of the image to be transferred on the second surface of the first sheet, the image forming position of the image to be transferred on the first surface of the first sheet.

5. The image forming apparatus according to claim 3, wherein the type of the sheet is determined based on one or a combination of a plurality of a size, a basis weight, a surface property, and a shape of the sheet.

6. The image forming apparatus according to claim 5, wherein the controller compares the type of the first sheet with the type related to the first information, and in a case where at least one of sizes, basis weights, surface properties, and shapes of the sheets does not match, determines the image forming position of the image to be transferred on the second surface of the first sheet to be the same position as the image forming position of the image to be transferred on the first surface of the first sheet.

7. The image forming apparatus according to claim 2, further comprising a plurality of sheet storage units, each being configured to store the sheet and to feed the sheet,
   wherein, the storage unit is configured to store, corresponding to each of the plurality of sheet storage units, the first information.

8. The image forming apparatus according to claim 2, wherein the first information stored in the storage unit is information which is stored when another job, which is performed before performing the print job, is performed.

9. The image forming apparatus according to claim 1, further comprising a storage unit configured to store information which represents the first forming position,
   wherein the controller is configured to determine, based on the information which represents the first forming position stored in the storage unit, an image forming position in the width direction of an image to be transferred on the first surface of a subsequent sheet which follows the first sheet.

10. The image forming apparatus according to claim 1, wherein the controller is configured to store, in the storage unit, a difference between the first forming position and the fourth detection result.

11. A method of controlling an image forming apparatus configured to form images on both sides of a sheet, the image forming apparatus comprising (a) an image forming unit configured to form an image on an image bearing member, (b) a first conveyer configured to convey the sheet on a conveyance path, and to move the sheet being conveyed toward a width direction, which is orthogonal to a conveyance direction, (c) a second converter configured to invert and convey, after the formed image is transferred onto a first surface of the sheet, the sheet to transfer an image onto a second surface of the sheet, and (d) a detector configured to detect a side edge position of the sheet in the width direction during conveyance for the transferring onto the first surface of the sheet, and during conveyance for the transferring onto the second surface of the sheet, respectively, the method comprising:
   determining, based on a first detection result of the detector for the first surface of a previous sheet which precedes a first sheet, a first forming position of an image to be transferred on the first surface of the first sheet on the image bearing member in the width direction;
   controlling, based on the first forming position and a second detection result of the detector for the first surface of the first sheet, the first conveyer to move the first sheet;
   determining a second forming position of the image to be transferred on the second surface of the first sheet based on a third detection result of the detector for the second surface of the previous sheet; and
   controlling the first conveyer to move the first sheet based on the second forming position and a fourth detection result of the detector for the second surface of the first sheet.

* * * * *